US006690476B1

(12) United States Patent
Hren

(10) Patent No.: US 6,690,476 B1
(45) Date of Patent: Feb. 10, 2004

(54) FULL FORM UTILIZATION FEATURE OF AN IMAGE FORMING DEVICE

(75) Inventor: Allan Anthony Hren, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/270,859

(22) Filed: Mar. 16, 1999

(51) Int. Cl.[7] ......................... G06F 15/00; B42D 15/00; B65H 3/44; B65H 3/06; B65H 29/00

(52) U.S. Cl. ..................... 358/1.12; 358/1.15; 283/104; 283/105; 283/106; 271/18; 271/220; 271/37; 271/117; 271/118; 271/188; 271/186; 271/280; 271/9.1

(58) Field of Search ............................... 358/1.15, 1.12; 283/104, 105, 106; 271/18, 220, 37, 117, 118, 188, 186, 280, 9.1

(56) References Cited

U.S. PATENT DOCUMENTS

| | | | | | |
|---|---|---|---|---|---|
| 3,856,128 | A | | 12/1974 | Taggart | 197/133 R |
| 4,941,377 | A | * | 7/1990 | Ishihara et al. | 83/211 |
| 5,063,416 | A | | 11/1991 | Honda et al. | 355/316 |
| 5,141,346 | A | * | 8/1992 | Nakagawa | 400/605 |
| 5,391,008 | A | * | 2/1995 | Hattori | 400/605 |
| 5,471,290 | A | * | 11/1995 | Nagayama et al. | 399/371 |
| 5,532,811 | A | | 7/1996 | Nishikawa et al. | 355/316 |
| 5,553,528 | A | | 9/1996 | Zoltner | 83/443 |
| 5,676,479 | A | * | 10/1997 | Yamaguchi et al. | 400/709 |
| 6,071,223 | A | * | 6/2000 | Reider et al. | 493/410 |

* cited by examiner

*Primary Examiner*—Edward Coles
*Assistant Examiner*—Monica Mitchell
(74) *Attorney, Agent, or Firm*—Scott W. Reid; Bracewell & Patterson, L.L.P.

(57) ABSTRACT

A method and system for unloading continuous forms media from an image forming device while utilizing full forms. The full form utilization feature of the present invention is applicable to printing onto sheets having multiple forms. During an automatic unload operation, the last printed form from a print run is unloaded and the first unused form is positioned to be the first printed form on a subsequent run. The full form utilization feature of the present invention reduces or minimizes the number of forms wasted during print runs.

24 Claims, 12 Drawing Sheets

- Form Definition — 60
  - Form Name — 61
  - Units of Measurement (inches/millimeters) — 62
  - Length — 63
  - Width — 64
  - Advanced Form Definition — 65
    - ▲ Forms per Sheet — 66
    - ▲ Insert Blanks for Fold Preservation (paper saver mode) — 67
- First Perforation — 68

FULL FORM UTILIZATION FEATURE OF AN IMAGE FORMING DEVICE

BACKGROUND OF THE INVENTION

1. Field of the Invention

This invention generally relates to image forming devices, and more specifically, a method and system for unloading media from image forming devices.

2. Description of the Related Art

Continuous forms printers refer to printers that use continuous forms media. The continuous forms media may include stacked sheets of paper which are folded in a box as shown in FIG. 1. FIG. 1 illustrates a box 1 which includes several stacked sheets 2, each sheet having a length (l) and a width (w). In this context, the term sheet refers to the portion of the media between two folds or perforation folds. It should be noted that in FIG. 1, each sheet represents a single form.

Within a continuous forms printer, the media travels along a media path (also referred to as a forms path or paper path). The media path generally refers to the entire route forms travel between the beginning state of being unused to the end state of a printed document. One characteristic of high speed continuous forms printers is that the media path is longer than the length (l) of a single sheet of paper.

FIG. 2 illustrates a media path 21 within printer 20. The media path 21 starts at 31 where paper is fed into printer 20 from an unused stack of paper 22 and ends at location 30 where printed paper is passed to a stacker 23. Location 24 along media path 21 represents the print start position and location 29 along media path 21 represents the print end position. It should be noted that media path 21 extends beyond print end position 29.

As a transport unit 28 transports the media between print start position 24 and print end position 29, an image may be transferred to the media via drum 26 (also referred to as an organic photoconductor cartridge) which receives toner from a developer 25. In general, once toner is on a sheet (i.e., immediately after the sheet has traveled pass a fusing system 27), that sheet is considered to be printed. The toner is permanently affixed to the media by heat and pressure from fusing system 27 before exiting the end of the media path at location 30.

In order to reduce the likelihood of paper jams caused by stacker 23, it is desirable to stack the media after printing with the folds in the same orientation as they were originally folded. If folding is done opposite the original fold direction, the jam rate may become unacceptably high.

Typically, the fold orientation of a continuous forms media is defined as having a "first fold up" or a "first fold down". If one places continuous forms media on a flat surface in the direction the media will enter a printer, the media typically has "memory" in that the first fold will either bulge up or down slightly. If the first fold bulges up, then the media has a first fold up orientation and if the first fold bulges down, then the media has a first fold down orientation.

Once the continuous forms media exits media path 21 at location 30, the sheets may be stacked by a stacker. Stackers are typically attached to or positioned near a printer at the media exit location. Two common types of stackers are the gravity stacker and the power stacker. If the continuous forms media that exits the printer has strong memory, it can fall onto the floor and essentially stack itself in the fold orientation it had when it came out of a box. In this situation a gravity stacker may be suitable. On the other hand, if the continuous forms media that exits the printer does not have strong enough memory for the gravity stacker, or higher reliability is required, a power stacker may be suitable.

A power stacker includes a folding mechanism which must fold the media to match the fold memory of the media. This can be accomplished two ways, either the folding mechanism always folds in one direction with the media always being loaded into the printer with the same fold orientation, or whenever media is loaded, an operator must provide input as to the fold orientation of the media loaded.

When media is unloaded from media path 21, the last printed sheet is cut from the media. Furthermore, if stacker 23 requires that the media always be loaded in the same fold orientation, an additional unused sheet may also be cut from the media. For example, assume that stacker 23 requires that media always be loaded having a first fold up orientation. If the last printed sheet has a fold up orientation, then the next unused sheet has a fold down orientation. If the media was cut at the fold boundary between the last printed sheet and the first unused sheet, then the media would be reloaded having a first fold down orientation which would not meet the set-up requirements of stacker 23 and likely cause paper jams. Thus, in this situation, the media is cut after the next unused sheet so that the media can be reloaded having a first fold up orientation.

On the other hand, if stacker 23 does not require that media always be loaded in the same fold orientation, then for the example above, the media is cut at the fold boundary between the last printed sheet and the first unused sheet. Because the first fold orientation of the media has changed from first fold up to first fold down, stacker 23 needs to be informed of this change, which is typically done via operator intervention.

In certain situations, it is desirable to have multiple forms per sheet. For example, when printing checks, multiple checks may be printed on a single sheet. FIG. 3 illustrates an example where there are three forms per sheet. Sheet 33 includes forms 33*a–c*, sheet 34 includes forms 34*a–c*, and sheet 35 includes forms 35*a–c*. In FIG. 3, stacked sheets 33, 34, and 35 have been pulled from box 32 to illustrate that when the media is loaded starting with sheet 33, it has a first fold up orientation. As shown in FIG. 3, adjacent sheets 33 and 34 are separated by a fold perforation and adjacent sheets 34 and 35 are also separated by a fold perforation. Furthermore, adjacent forms within each sheet are separated by a perforation.

When media having multiple forms per sheet are used, it is likely that unused forms will be wasted when unloading the last printed form because mechanical stacking is based on the fold length of the sheet rather than a form. For example, assuming the stacker is set for a first fold up orientation and there are three sheets per form, if the first form (33*a*) of a sheet (33) having a fold up orientation is printed and there are no more forms to print, then in a first situation five unused forms are wasted and in a second situation two unused forms are wasted.

Five unused forms are wasted when the stacker requires media to always be loaded with the same fold orientation. In this situation, the media is cut after the two forms (33*b–c*) on the first sheet (33), a fold, and three forms (34*a–c*) in the next sheet (34). Based on this example, it is possible to waste five of the six forms when unloading.

Two unused form are wasted when the stacker does not require that the media always be loaded in the same fold orientation. In this situation, the media is cut after the two forms (33*b*–*c*) on the first sheet (33) and the stacker is reset to a first fold down orientation. Based on this example, the number of wasted forms is reduced from five to two forms; however, operator intervention is typically required to reset the stacker to change to first fold orientation.

In certain situations, it may be desirable to unload the media without wasting any forms and/or sheets. For example, when printing numbered forms, such as checks, the operators must manually account for the wasted forms.

SUMMARY OF THE INVENTION

An object of the present invention is to utilize full forms on consecutive print runs while automatically unloading print runs.

Another object of the present invention is to minimize the number of forms wasted during an unload operation.

A method of unloading media from a media path in an image forming device is described. The media includes a plurality of sheets with each full sheet having multiple forms such that a pair of adjacent forms includes a set of forms. A first form positioned at a print start position on the media path is advanced to a print end position on the media path. In response to an automatic unload request, the first form is cut from the media. Further in response to an automatic unload request, a next unused form is positioned at the print start position such that no forms are wasted between consecutive print runs due to an automatic unload operation. The first form and the next unused form are both from the set of forms.

A method of controlling a stacker for stacking media received from a media path in an image forming device is also described. The media includes a plurality of sheets with each full sheet including N forms. A first set of control values is provided to set the stacker for a first sheet. The first sheet represents a partial or full sheet. A second set of control values is provided to reset the stacker, if necessary, for a second sheet. The second sheet represents a full sheet.

An image forming device is described. The image forming device operates with media having multiple sheets with each full sheet including multiple forms. The image forming device includes a print engine having a media path with a print start position and a print end position. During an automatic unload operation, a last printed form from a first print run located at the print end position is removed from the media path. A first unused form is then positioned at the print start position in preparation for a subsequent print run. The image forming device also includes a printer controller coupled to the print engine. The printer controller controls the movement of forms along the media path during an automatic unload operation based on a first value. The first value represents a positioning orientation of a pair of adjacent sheets with respect to the print start position and a designated first fold orientation.

A printer controller is also described. The printer controller includes a memory device coupled to a processing unit. The memory device stores a first value and form definition values during an automatic unload operation. The first value represents a positioning orientation of a pair of adjacent sheets with respect to a print start position on a media path and a designated first fold orientation. The processing unit provides a first set of control values and a second set of control values based on the first value, the designated first fold orientation and the forms definition values. During the automatic unload operation, the first set of control values sets the stacker for a first sheet which is either a partial or full sheet, and the second set of control values sets the stacker, if necessary, for a second sheet which is a full sheet.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PREFERRED EMBODIMENTS

The preferred embodiments of the present invention are directed at a method, system and article of manufacture for utilizing full forms when printing onto a continuous forms media. More specifically, the preferred embodiments are applicable to printing onto various combinations of forms. For example, the continuous forms media may have one form per sheet, two forms per sheet, three forms per sheet, or any other number of forms per sheet. The full form utilization feature of an image forming device reduces or minimizes the number of forms wasted between print runs. In other words, when unloading the last printed form from a print run, the next unused form is the first form printed in a subsequent print run.

Figures 4, 6:
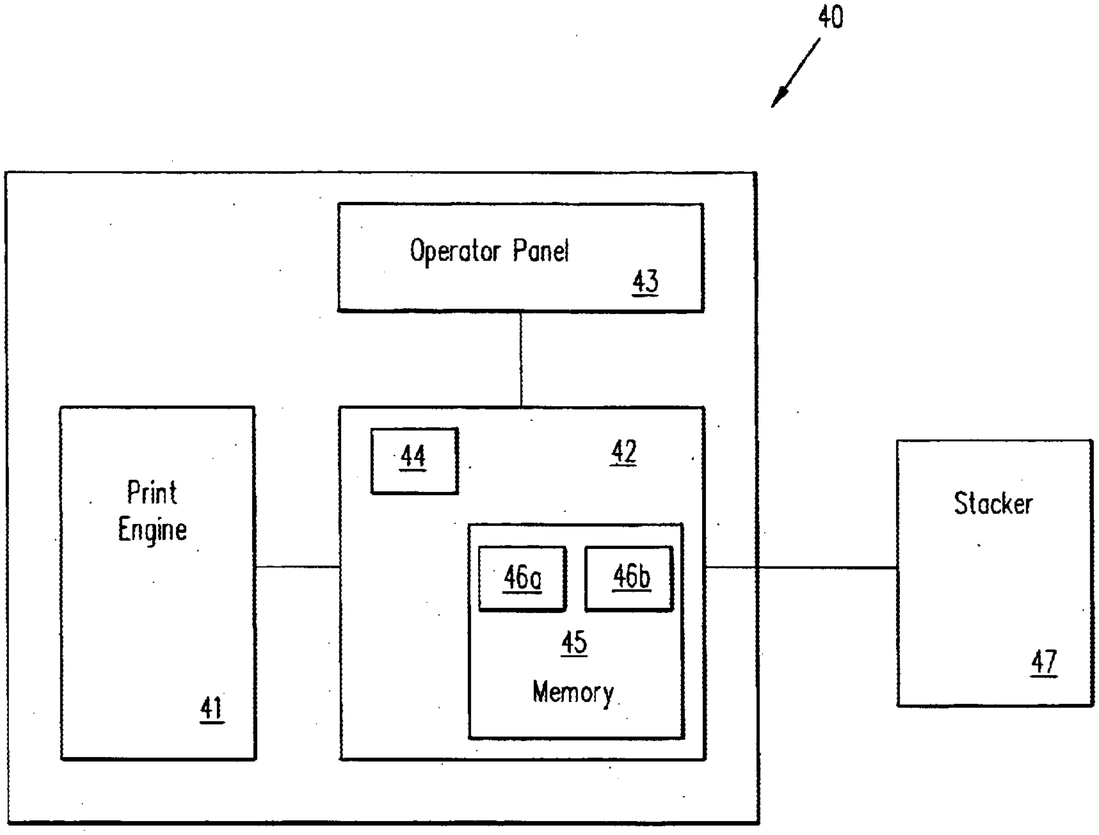
FIG. 4 illustrates an image forming device for one embodiment of the present invention.
FIG. 6 illustrates a Form Definition structure for one embodiment of the present invention.

FIG. 4 illustrates an image forming device 40 for one embodiment of the present invention. While FIG. 4 refers to a laser printer it should be understood that the present invention is not limited to laser printers and is applicable to other image forming devices such as facsimile machines, thermal printers, impact printers, ink jet printers and other similar image forming devices which can use continuous forms media.

Printer 40 includes a print engine 41, a printer controller 42, and an operator panel 43. The print engine 41 physically transfers an image to the print media under the control of printer controller 42 which includes a processing unit 44, such as a RISC based processor, and a memory device 45. Memory device 45 includes, but is not limited to, fixed (hard) disk drives, diskettes, optical disks, magnetic tape, semiconductor memories such as RAM, ROM, Proms, etc. Additionally, printer controller 42 controls the movement of forms along a media path within print engine 41. In addition to providing control signals to print engine 41, printer controller 42 provides control signals to stacker 47. A portion 46*a* of memory 45 stores control codes, i.e., programming instructions, to instruct processing unit 44 to generate control signals. A portion 46*b* of memory 45 stores control values, such as form definition values and first perf values (described below) to control print engine 41 and/or stacker 47 such that printer 40 can be set for full form utilization. Typically, when unloading while implementing a full form utilization feature, the last printed form can be unloaded and the next unused form can be backed to a location before the toner transfer location (i.e., print start position of the media path).

Figure 5:
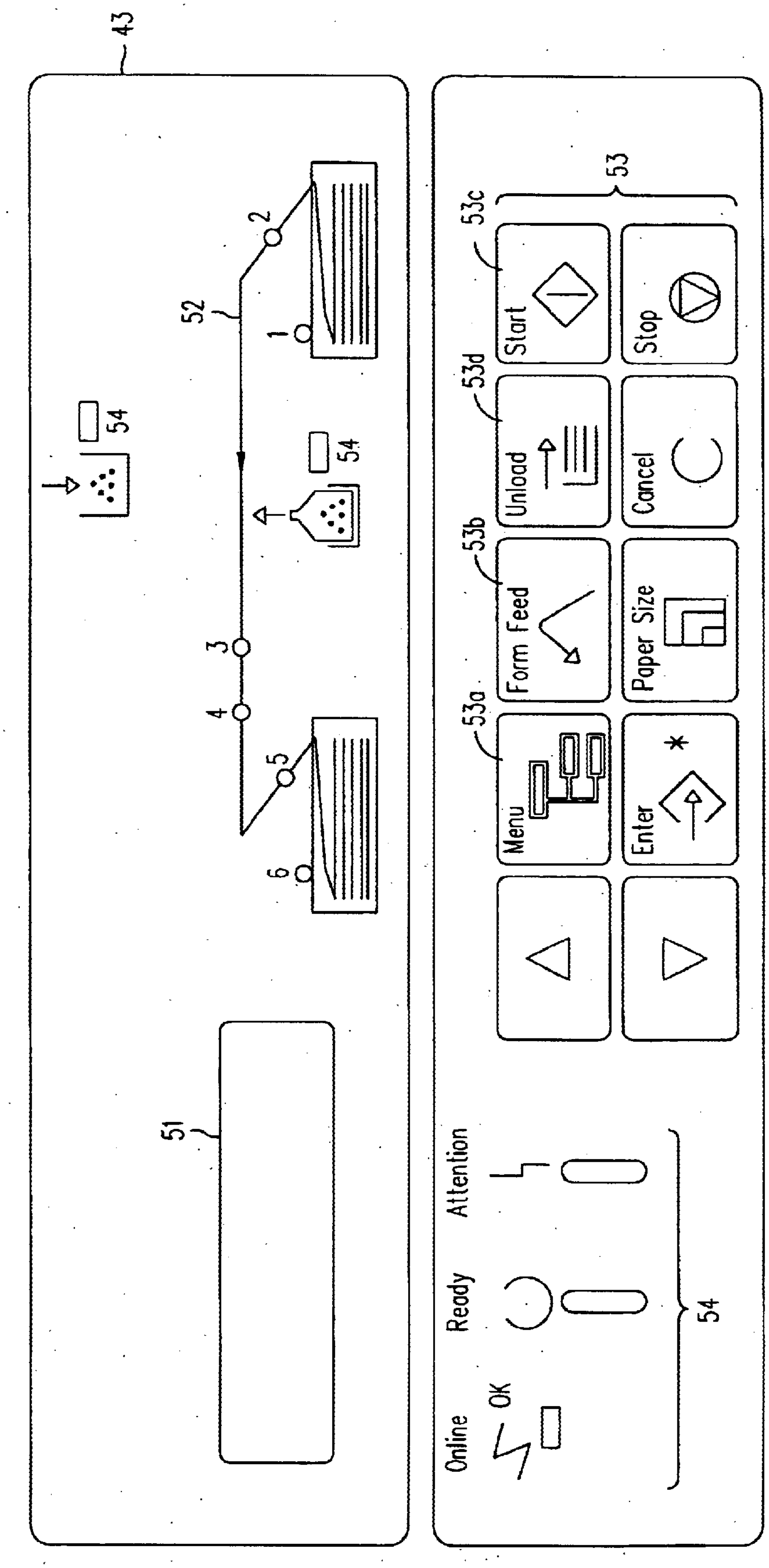
FIG. 5 illustrates an operator panel of an image forming device for one embodiment of the present invention.

Printer 40 also includes an operator panel 43. For one embodiment, operator panel 43 may be located on the right front cover of printer 40 and may include a display 51, a set of printer function keys 53, a set of indicators 54, and a forms path indicator 52 as shown in FIG. 5.

To facilitate full form utilization of printer 40 certain information is required from the operator. A structure referred to as a Form Definition is input by the operator through a menu function key 53*a* on operator panel 43 for one or more types of media. Menu key 53*a* is generally used to select printer settings and enter choices. The Form Definition structure 60 is shown in FIG. 6. One Form Definition is input by the operator for each physically different media used. For one embodiment, Form Definition structure 60 for each media type is stored in portion 46*b* of memory 35 in printer controller 42.

The Form Definition structure 60 includes a Form Name field 61, a Units of Measurement field 62, a Length field 63, a Width field 64, and an Advanced Form Definition field 65. The Advanced Form Definition field 65 includes a Forms per Sheet field 66 and an Insert Blanks for Fold Preservation field 67. Field 65 is used when selecting automatic unloading. Automatic unload is used to describe the process of clearing all printed forms from the media path and then loading the unused media for the resumption of printing without any operator intervention.

For each Form Definition structure 60, the operator must input a form name into Form Name field 61 to allow the operator to easily select the previously entered Form Definitions when a different media is loaded in printer 40. The length, width and units of measurement of a form are input by the operator into fields 63, 64, and 65, respectively, for printing and form path management. Based on the dimensions of a form and the number of forms per sheet, the dimensions of a sheet can be determined for a particular media.

For advanced forms definitions, the number of forms per sheet is input into field 66 in order to manage the automatic unload process. Furthermore, the operator is required to enter "True" or "False" into field 67. For one embodiment of the present invention, if field 67 is set to "False", then the controller operates in a "Paper Saver Mode" also referred to as full form utilization. On the other hand, if field 67 is set to "True", then the controller operates in a "Normal Mode." It should be noted that Paper Saver Mode requires slightly more operator involvement than "Normal Mode". These modes will be described in more detail below.

In Normal Mode of operation, each time the media is loaded, it is loaded with the same fold orientation. For preferred embodiments of the present invention, a printer controller is configured for a first fold up orientation. For alternative embodiments of the present invention, a printer controller may be configured for a first fold down orientation. Each time the media is automatically unloaded, the necessary automatic media advancement is done so that the media fold orientation is the same as when the operator first loaded the media. Furthermore, each time the forms path has an intervention error and media is manually removed from the printer, the operator always loads the media on a fold boundary, with a same first fold orientation. For Normal Mode, the operator does not have to provide the input at media load time as to the fold orientation of the media. Normal Mode is provided for those operators who would rather have wasted forms than provide input to the printer at media load time.

For the Paper Saver Mode of operation, the printer utilizes the full form without wasting unused forms while automatically unloading and reloading the media. In order to operate in the Paper Saver Mode, an additional control structure referred to as a First Perforation is used. FIG. 6 illustrates a First Perforation structure 68. When the Paper Saver Mode is selected, the operator is required to input a value (also referred to as first perf) into First Perforation structure 68. For one embodiment of the present invention, first perf value is an integer set by both the operator and printer controller 42. More specifically, the first perf value is provided by an operator during a manual unload operation, and is set by printer controller 42 during an automatic unload operation.

Figure 9:
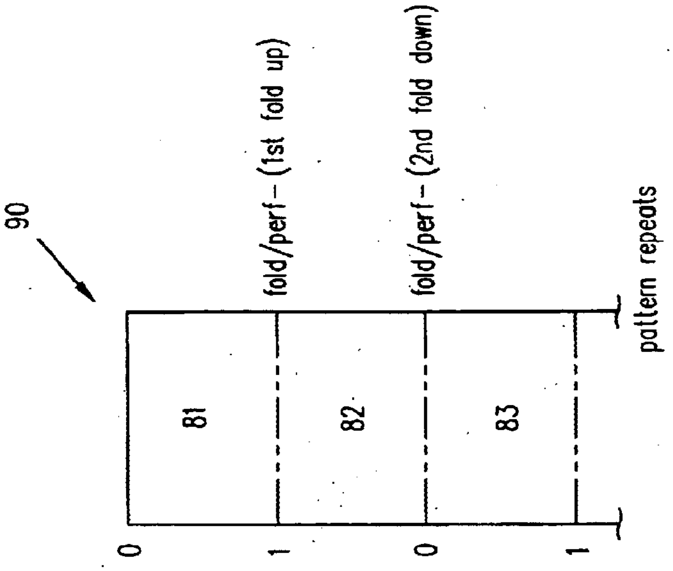
FIG. 9 illustrates a continuous forms media having a single form per sheet.
Figure 8:
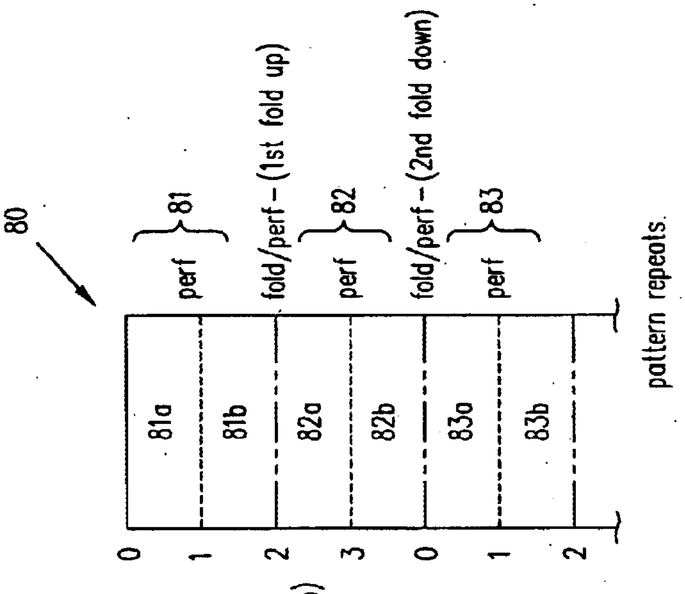
FIG. 8 illustrates a continuous forms media having two forms per sheet.
Figure 7:
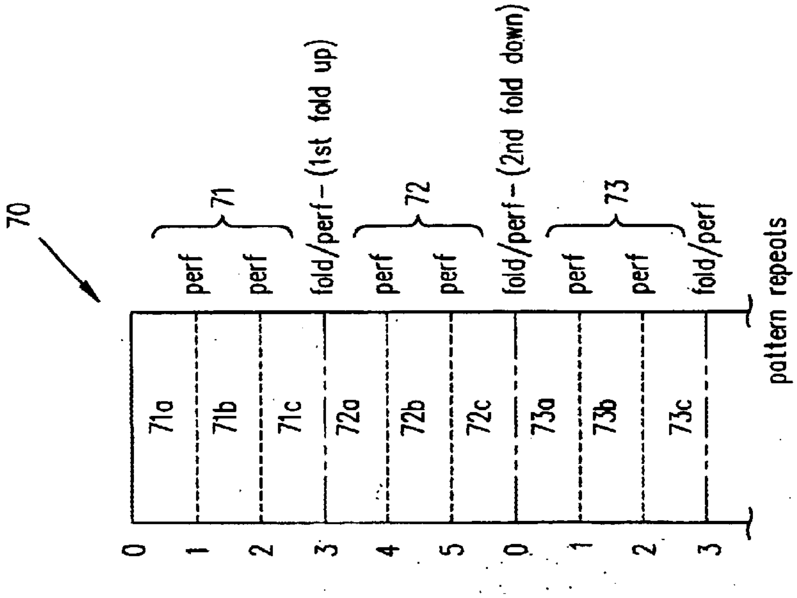
FIG. 7 illustrates a continuous forms media having three forms per sheet.

FIGS. 7, 8, and 9 illustrate the values assigned to first perf in several combinations of forms per sheet. It should be noted that when using the first perf value, a pair of sheets are always grouped together. In general, the first perf value represents the positioning orientation of a pair of sheets with respect to the print start position in a media path. Additionally, for any combination of forms per sheet, the first perf value has a ranged between zero and (2N−1) where N equals the number of forms per sheet. Although FIGS. 7–9 illustrate media having one, two, and three forms per sheet, for alternative embodiments, N may have a value greater then three. Media 70, 80, and 90 all have a first fold up orientation. For alternative embodiments, media 70, 80, and may have a first fold down orientation.

FIG. 7 illustrates media 70 having three forms per sheet. The portion of media 70 shown in FIG. 7 includes three sheets 71, 72, and 73. Sheet 71 includes three forms 71*a*–*c*, sheet 72 includes three forms 72*a*–*c*, and sheet 73 includes three forms 73*a*–*c*. Sheets 71 and 72 together may be referred to as a pair of sheets. Shown on the left hand side of media 70 is the first perf values, which range from 0 to 5. Each first perf value corresponds to a form in the pair of sheets. Also note that the portion of media 70 shown has a first fold up orientation.

When form 71*a* is positioned at the print start position in a media path, first perf equals 0; when form 71*b* is positioned at the print start position, first perf equals 1; when form 71*c* is positioned at the print start position, first perf equals 2;

when form 72*a* is positioned at the print start position, first perf equals 3; when form 72*b* is positioned at the print start position, first perf equals 4; and when form 72*c* is positioned at the print start position, first perf equals 5. This pattern repeats itself with the next pair of sheets. Note that sheet 73 is the first sheet in the next pair of sheets.

FIG. 8 illustrates a media 80 having 2 forms per sheet. Sheet 81 includes forms 81*a–b*, sheet 82 includes forms 82*a–b*, and sheet 83 includes forms 83*a–b*. Sheets 81 and 82 form a pair of sheets. Shown on the left side of media 80 are the first perf values that correspond to forms 81*a–b*, 82*a–b*, and 83*a–b*. The first perf values range from 0 to 3.

FIG. 9 illustrates a media 90 having a single form per sheet. Sheets 81, 82 and 83 each represent a single form. Sheets 81 and 82 also represent a pair of sheets having first perf values ranging from 0 to 1.

Referring back to FIG. 7, assuming that media 70 has been loaded in printer 40, which has been set to operate in Paper Saver Mode, if forms 71*a* and 71*b* have been used on a previous print run, an operator would set first perf to 2 when the remaining media (starting at form 71*c*) was manually loaded into printer 20 for another print run. Once media has been loaded and first perf set by an operator, subsequent automatic unloads and the stacking of forms are handled by printer controller 42, without operator involvement in the first perf setting.

On the other hand, if printer 40 was set to operate in Normal Mode, after printing forms 71*a* and 71*b*, when unloading, printed forms 71*a–b* and unused forms 71*c* and 72*a–c* are all unloaded so that the media is cut at a fold orientation matching the original fold orientation. Here it is assumed that the original fold orientation is first fold up. This allows media 70 to be reloaded starting at form 73*a*, which has the same fold orientation as the original fold orientation. For Normal Mode, the first perf value is not used.

For one embodiment of the present invention, when operating in Paper Saver Mode, a paper path error such as a paper jam or a change of media (which requires a new form definition), may be handled in the same manner as unload requests. For alternative embodiments, upon the occurrence of a paper path error or a change of media, printer controller 42 may set first perf to "0". Note that from a practical standpoint, after a jam or a change of media, this allows the operator to load the media in Normal Mode with a full sheet having the first fold in the standard orientation. Typically, in these situations, the operation is required to manually load the media and has already accounted for any lost media from the previous print run.

Figure 10:
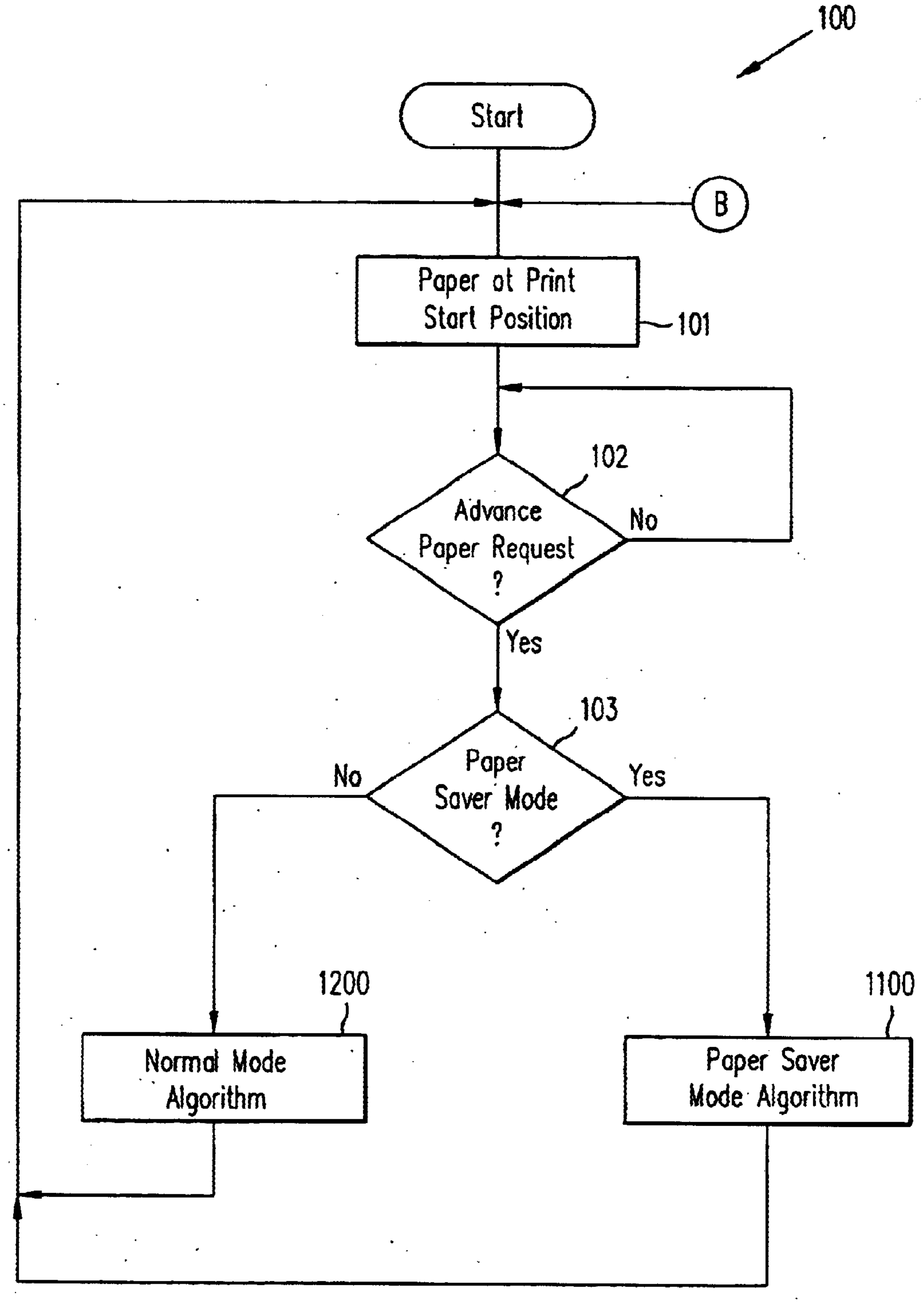
FIG. 10 illustrates a flow diagram for performing form management according to one embodiment of the present invention.
Figure 11:
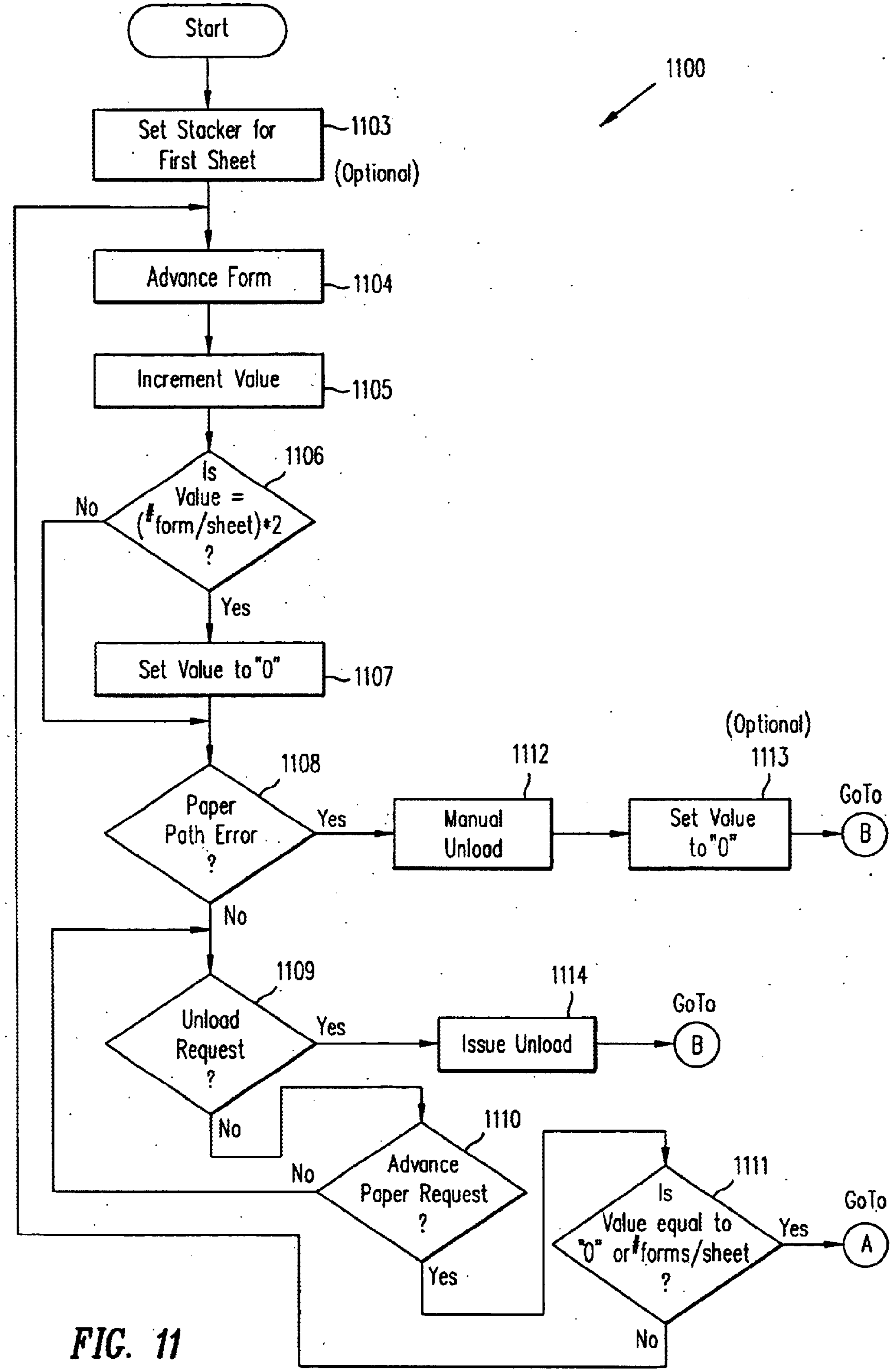
FIGS. 11 and 12 illustrate a flow diagram for the Paper Saver Mode for one embodiment of the present invention.
Figure 12:
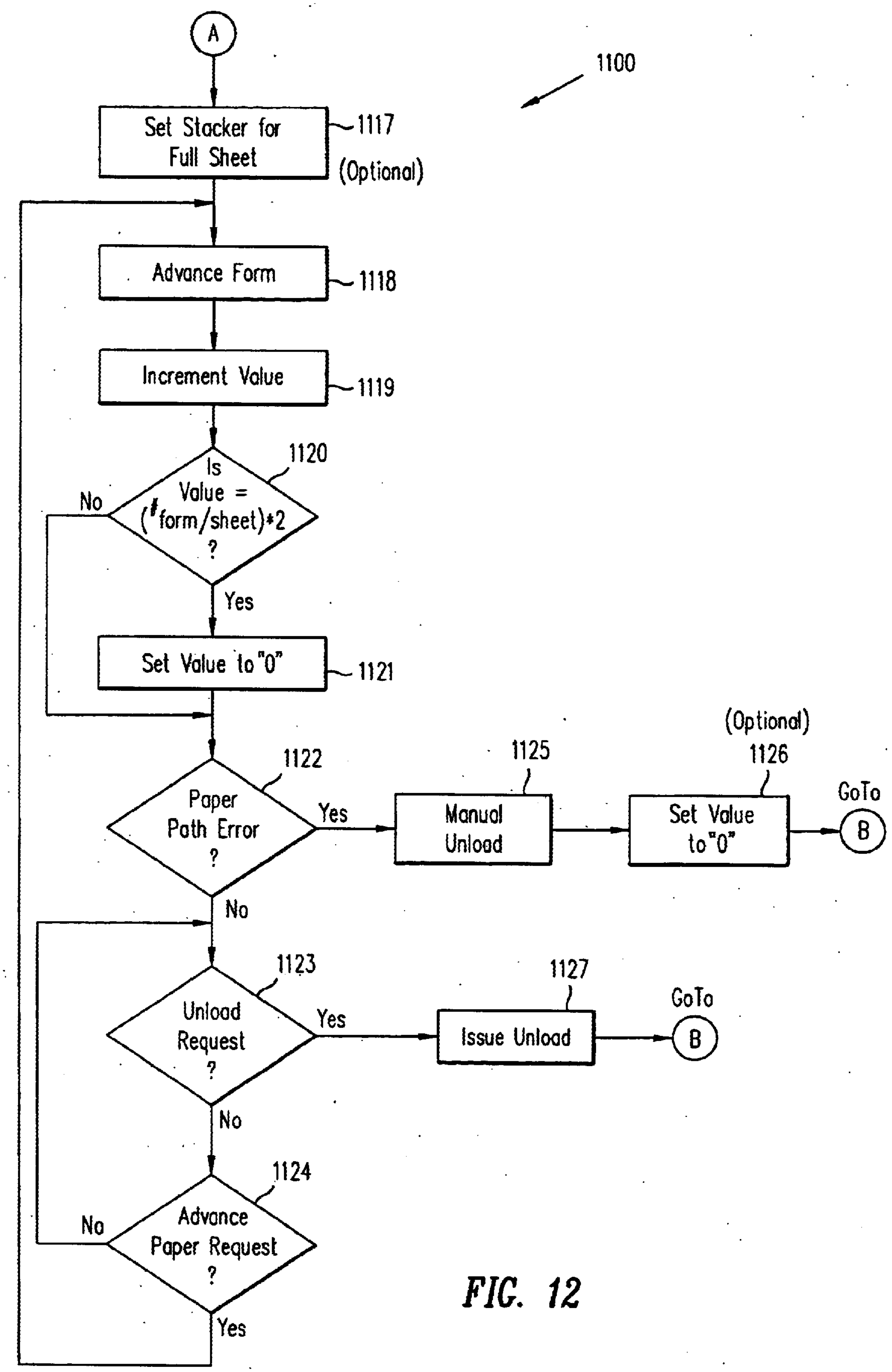

FIGS. 10–12 describe a software algorithm performed by printer controller 42 to allow the printing and stacking of all combinations of forms per sheet without the need for wasted forms during automatic unloading of an image forming device. More specifically, the algorithm controls print engine 41 such that when printed media is unloaded, the unprinted media following the last printed form can be backed to a location before the toner transfer location.

Although FIGS. 10–12 are directed at a printer which uses a power stacker, a power stacker or other similar media stacker is not a requirement of the present invention. Thus, all steps that refer to a stacker are considered optional steps. Furthermore, although one embodiment of the present invention is described in conjunction with a laser printer, alternative embodiments are not limited to laser printers and may include any type of image forming device that utilizes continuous forms media having stacked or folded sheets.

Furthermore, although the term paper is often used to describe the media type, it should be noted that the present invention may operate with any type of continuous forms media that can be folded.

FIG. 10 illustrates a form management flow diagram 100 used by printer controller 42 for one embodiment of the present invention. At the start of flow diagram 100, the forms definition for the media has already been selected by the operator. Thus, for the selected media, printer controller 42 knows the number of forms per sheet and the dimensions of each form (e.g., length and width). Additionally, the fold orientation of the first sheet has been selected as either first fold up or first fold down. For a preferred embodiment of the present invention, printer controller 42 is configured for a first fold up orientation. For alternative embodiments, printer controller 42 is configured for a first fold down orientation.

At step 101, the media has been loaded and a first form is positioned at the print start position within the media path. For laser printers, the print start position refers to the location along the media path before the toner transfer location. For example, at location 24 along media path 21 within printer 20.

Once media has been loaded, printer controller 42 waits for an advance paper request. The advance paper request may be a form feed request or a print request. Referring to the printer operator panel 43 shown in FIG. 5, for one embodiment of the present invention, a form feed request is received when the operator selects Form Feed function key 53*b* and a print request is received when printer controller 42 is in the ready state and receives data from a host. Start function key 53*c* is selected to put printer controller 42 in a print ready state. However, certain operations, such as an unload operation, temporarily halts the ready state.

Figure 15A:
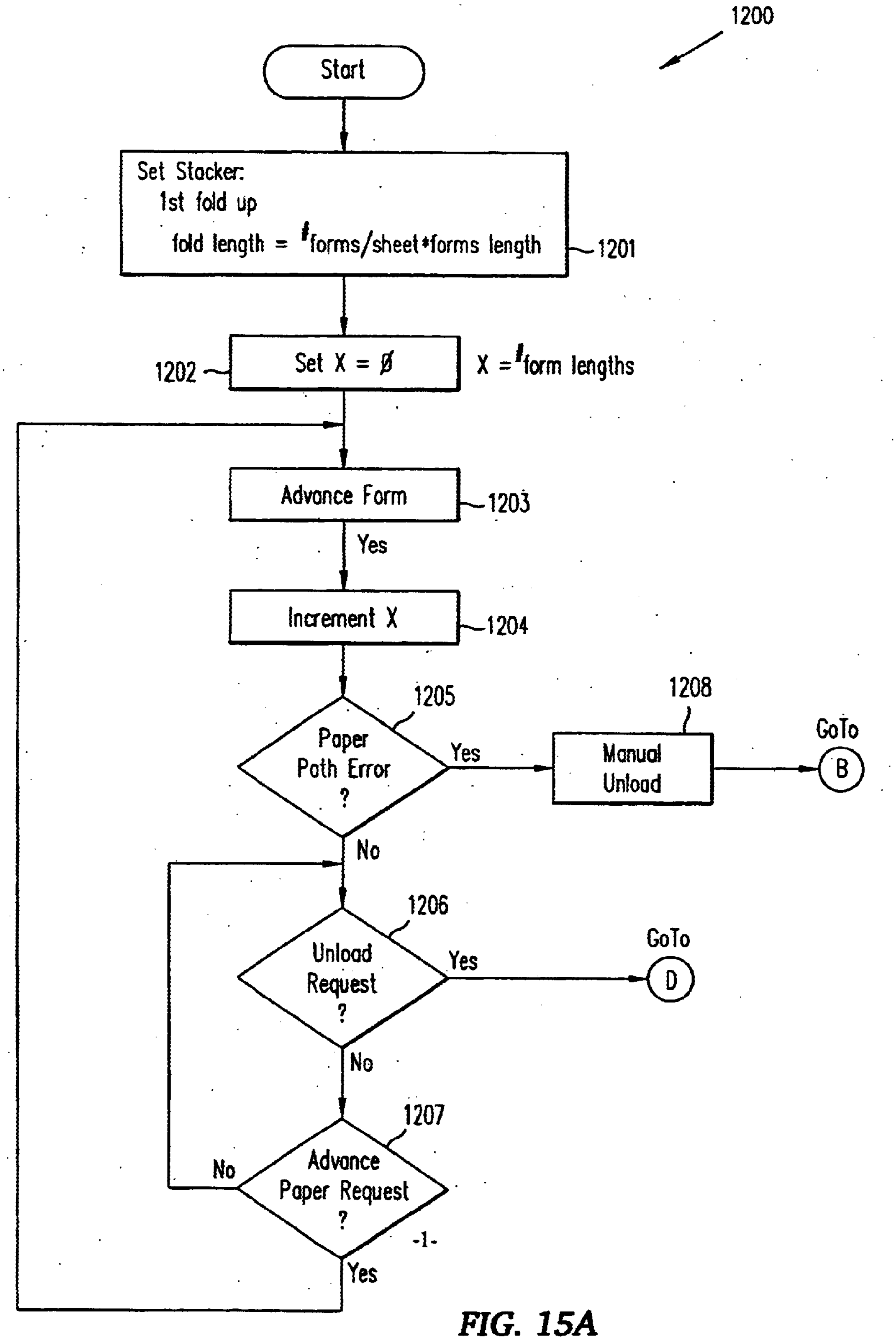
FIGS. 15A and 15B illustrate two parts of a flow diagram for the Normal Mode for one embodiment of the present invention.
Figure 15B:
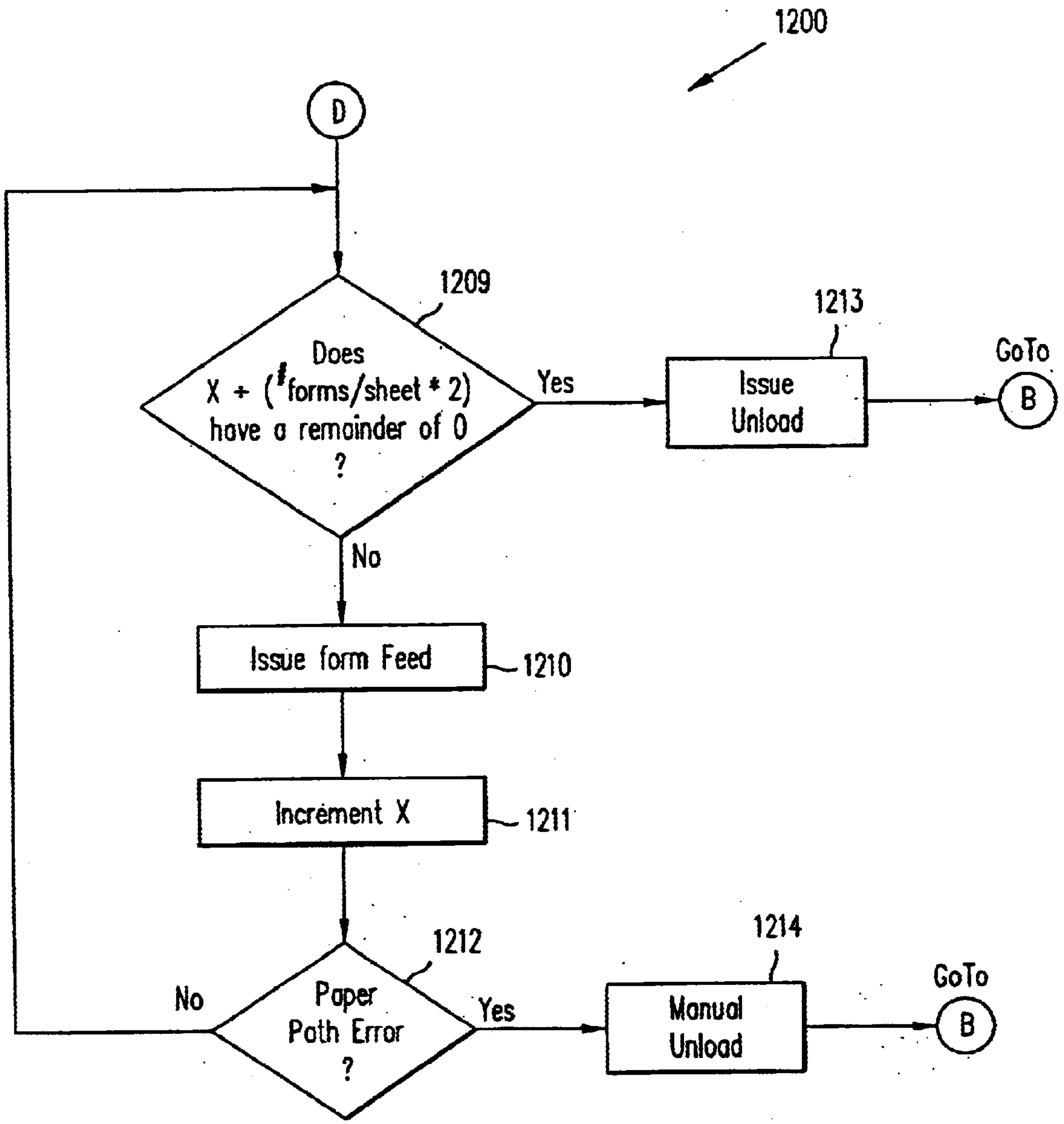

Once an advance paper request is received for the first form, printer controller 42 determines whether Paper Saver Mode has been selected. For one embodiment of the present invention, Paper Saver Mode may be selected by setting the Insert Blanks for Fold Preservation field 67 to "False" as described above. If Paper Saver Mode is not selected, then step 1200 is the next step. FIG. 15 describes the normal mode algorithm of step 1200 in more detail.

If Paper Saver Mode is selected, the step 1100 is the next step. FIGS. 11 and 12 describe the paper saver mode algorithm of step 1100 in more detail. If the paper has been loaded by an operator, then the operator is required to input the first perf value, also referred to as the value, via an operator panel. On the other hand, if the paper has been loaded via an automatic unload, then the operator is not required to provide the first perf value.

Once step 1100 or 1200 has been completed, flow diagram 100 returns to step 101 and the next unprinted form is positioned at the print start position in the media path of a printer.

For an alternative embodiment, printer controller 42 may only operate in Paper Saving Mode. Thus, the operator would not have the option of setting printer 40 to operate in Normal Mode. For this embodiment, flow chart 100 can be followed with the exception that steps 103 and 1200 are eliminated.

FIG. 11 illustrates the paper saver mode algorithm of step 1100 in further detail. If a power stacker is being used to stack media, then the stacker is set for a first sheet as shown in step 1103. The first sheet refers to the first unused sheet at the print start position and may include a partial or full sheet. Note that step 1103 is described in further detail in FIG. 13.

Figure 13:
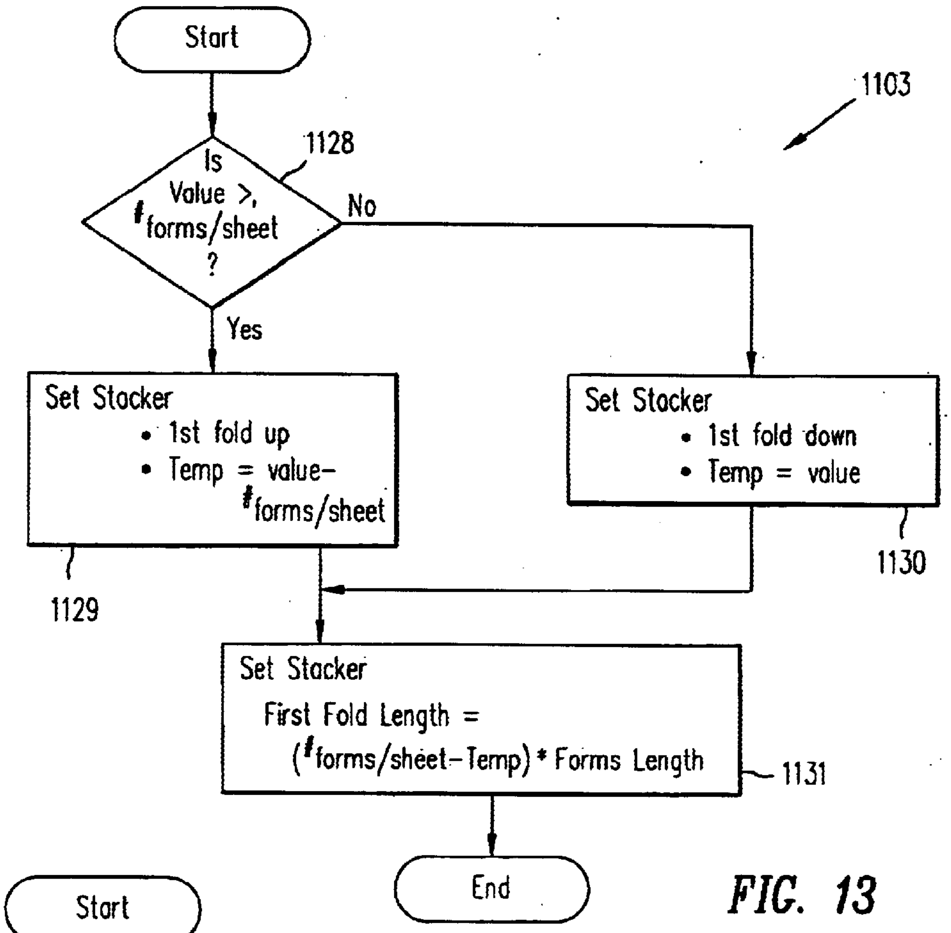
FIG. 13 illustrates a flow diagram for setting a stacker for a sheet which may be a full or partial sheet according to one embodiment of the present invention.

Referring now to FIG. 13 which describes the steps for setting stacker 47 for the first sheet, at step 1128, a determination is made whether or not the first perf value is greater or equal to the number of forms per sheet (#forms/sheet).

If the answer to step 1128 is "yes", then stacker 47 is set to a first fold up orientation. Furthermore, a temporary value (Temp) is set to the first perf value minus the #forms/sheet.

If the answer to step 1128 is "no", then stacker 47 is set to a first fold down orientation. Furthermore, a temporary value (Temp) is set to the first perf value.

Note that steps 1128, 1129, and 1130 assume that controller 42 is configured for a first fold up orientation.

Next, at step 1131, stacker 47 is set to have a fold length equal to (#forms/sheet-Temp) multiplied by the forms length. This value is referred to as partial fold length.

Referring back to FIG. 11, at step 1104, the first form, which refers to the form positioned at the print start position in the media path, is advanced by either printing on it in response to a print request, or forwarding it (without any printing) in response to a form feed request.

At step 1105, the first perf value is incremented by one. Next, the first perf value is compared to the number of forms per sheet (#forms/sheet) multiplied by 2. For example, if the #forms/sheet equals 3, then the first perf value is compared to 6. If the first perf value is equal to 2 times the #forms/sheet then first perf value is set to "0" otherwise first perf value is left unchanged.

At step 1108, printer controller 42 checks to see if a paper path error has occurred. A paper path error refers to any type of error in which the paper position within the printer is lost. A common type of paper path error is a paper jam, which refers to a condition in a printer where forms have become blocked or wedged in the media path so the printer cannot operate.

If a paper path error has occurred, the operator is typically required to manually unload the media such that any damaged forms can be discarded. For one embodiment of this invention, the first perf value is set by printer controller 42 to "0" when a paper path error is detected. For alternative embodiments, the first perf value may be set to some other value to minimize the number of wasted forms, or simply left unchanged. Next, flow diagram 1100 returns to step 101 in FIG. 10.

If a paper path error has not been detected, then printer controller 42 waits for either an unload request at step 1109 or an advance paper command at step 1110. If an unload request is received, then printer controller 42 issues an unload command to perform an unload operation. For one embodiment of the present invention, an operator selects an Unload function key 53*d* in operator panel 43 to unload the media. Printer controller 42 then responds to this unload request. When an unload operation is performed, the media is cut after the last printed form and then the next unused form is positioned at the print start location in the media path. Once the unload operation is completed in step 1114, flow diagram 1100 returns to step 101 in FIG. 10.

If an advance paper request is received in step 1110, then the first perf value compared to "0" and the #forms/sheet. If the fist perf value does not equal "0" or the #forms/sheet then flow diagram 1100 returns to step 1104, otherwise flow diagram 1100 goes to step 1117 in FIG. 12.

At step 1117, if a power stacker is used and it is necessary to reset stacker 47 for a full sheet, then stacker 47 is reset. Stacker 47 is required to be reset if the fold length of the first sheet is different from the fold length of the full sheet (i.e, fold length of the first sheet=fold length of a full sheet).

Figure 14:
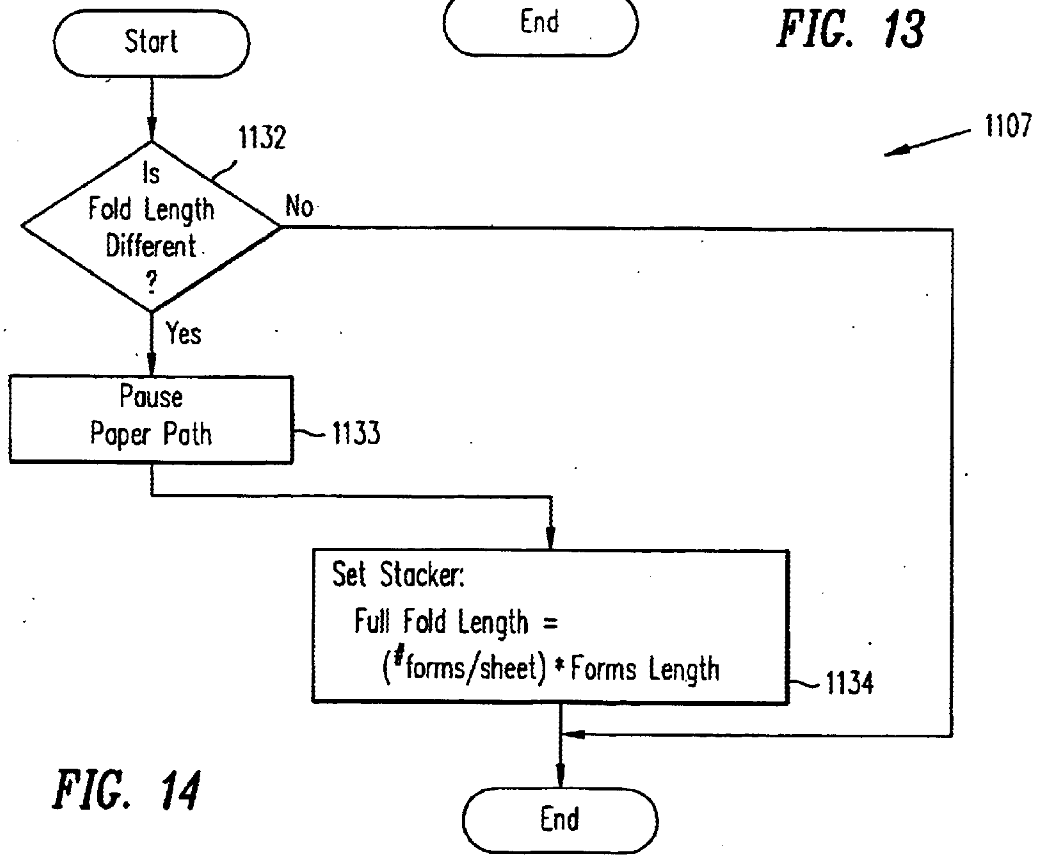
FIG. 14 illustrates a flow diagram for setting a stacker for a full sheet according to one embodiment of the present invention.

Referring now to FIG. 14 which describes step 1117 in further detail. At step 1132, the fold length of the first sheet (as determined in step 1131) is compared to the fold length of a full sheet (provided in the forms definition). If these values are different, then at step 1133, the paper path is paused so that stacker 47 can have its fold length reset to reflect a full fold length which is equivalent to #forms/sheet multiplied by the forms length.

Referring back to FIG. 12, at step 1118, the form positioned at the print start position is advanced in response to a form feed request or a print request. At step 1119, the first perf value is then incremented by 1. Then, at step 1120, the first perf value is compared to 2 times the #forms/sheet. If first perf equals 2 times the #forms/sheet, then first perf value is set to "0" at step 1121, otherwise the first perf value is left unchanged.

Steps 1122, 1125, and 1126 related to detecting a paper path error are similar to steps 1108, 1112, and 1113 described above. Furthermore, steps 1123 and 1127 related to receiving an unload request are similar to steps 1109 and 1114 described above.

If an advance paper request is received in step 1124, then flow diagram 1100 returns to step 1118.

Referring now to FIG. 15, which describes the normal mode algorithm of step 1200. The stacker 47 is set at step 1201. For one embodiment of the present invention, the fold orientation is set to first fold up and the fold length is set to #forms/sheet multiplied by the forms length. Then, at step 1202 the counter X is set to "0". Note that counter X counts the number of form lengths that have been advanced.

At step 1203 the form is advanced in response to a form feed request or a print request. Then counter X is incremented by 1.

At step 1205, the media path is checked for any paper path errors. If a paper path error is detected then the media is manually unloaded at step 1208 and the flow diagram returns to step 101 in FIG. 10. If a paper path error is not detected, then printer controller 42 waits for either an unload request at step 1206 or an advance form request at step 1207. If an unload request is not received but an advance form request is received, then flow chart 1200 returns to step 1203. If an unload request is received, then the next step is step 1209 in FIG. 16. Note that when an unload request is received, printer controller 42 advances the media, if necessary so that the media is cut at a fold orientation matching the originally loaded fold orientation.

Figure 1:
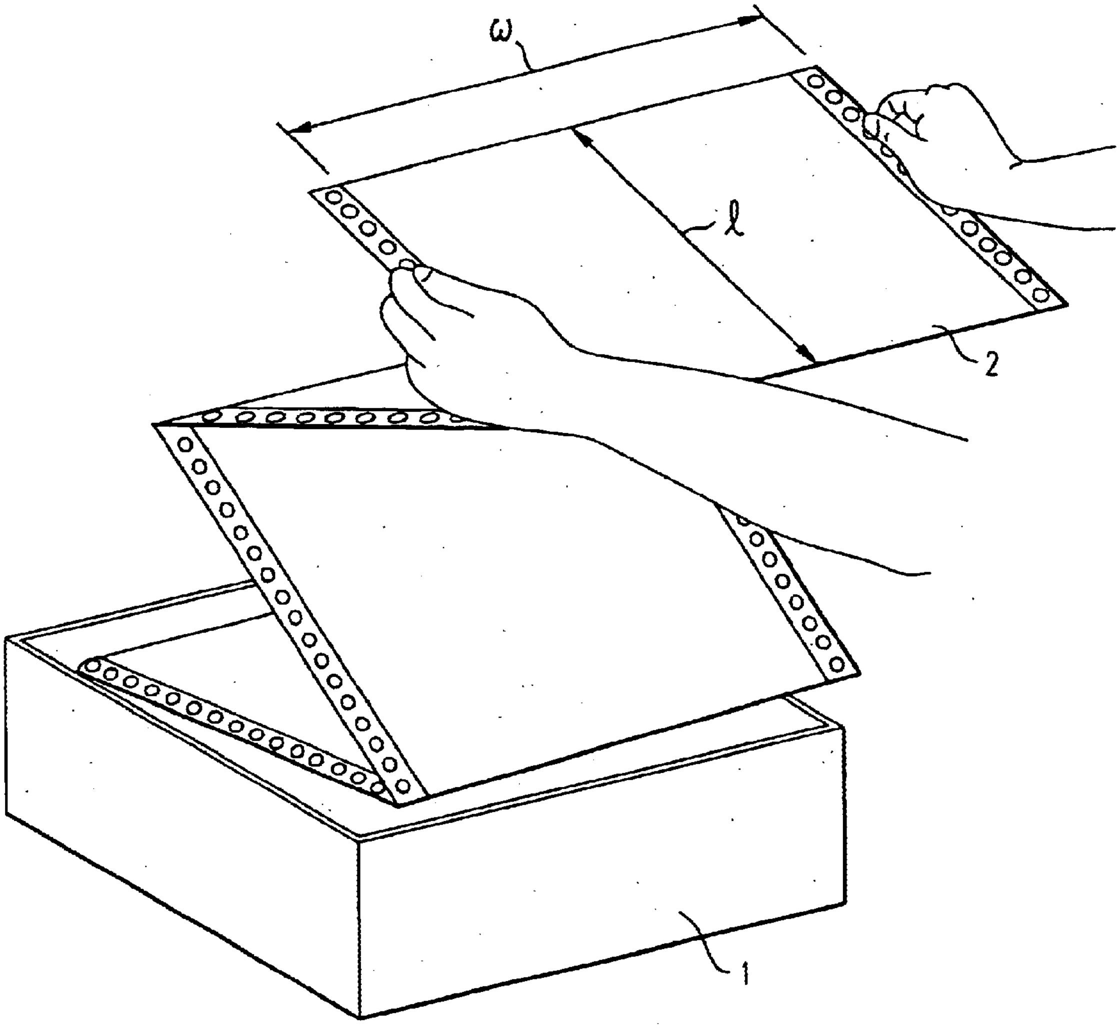
FIG. 1 illustrates a continuous forms media having a single form per sheet packaged in a box.
Figure 2:
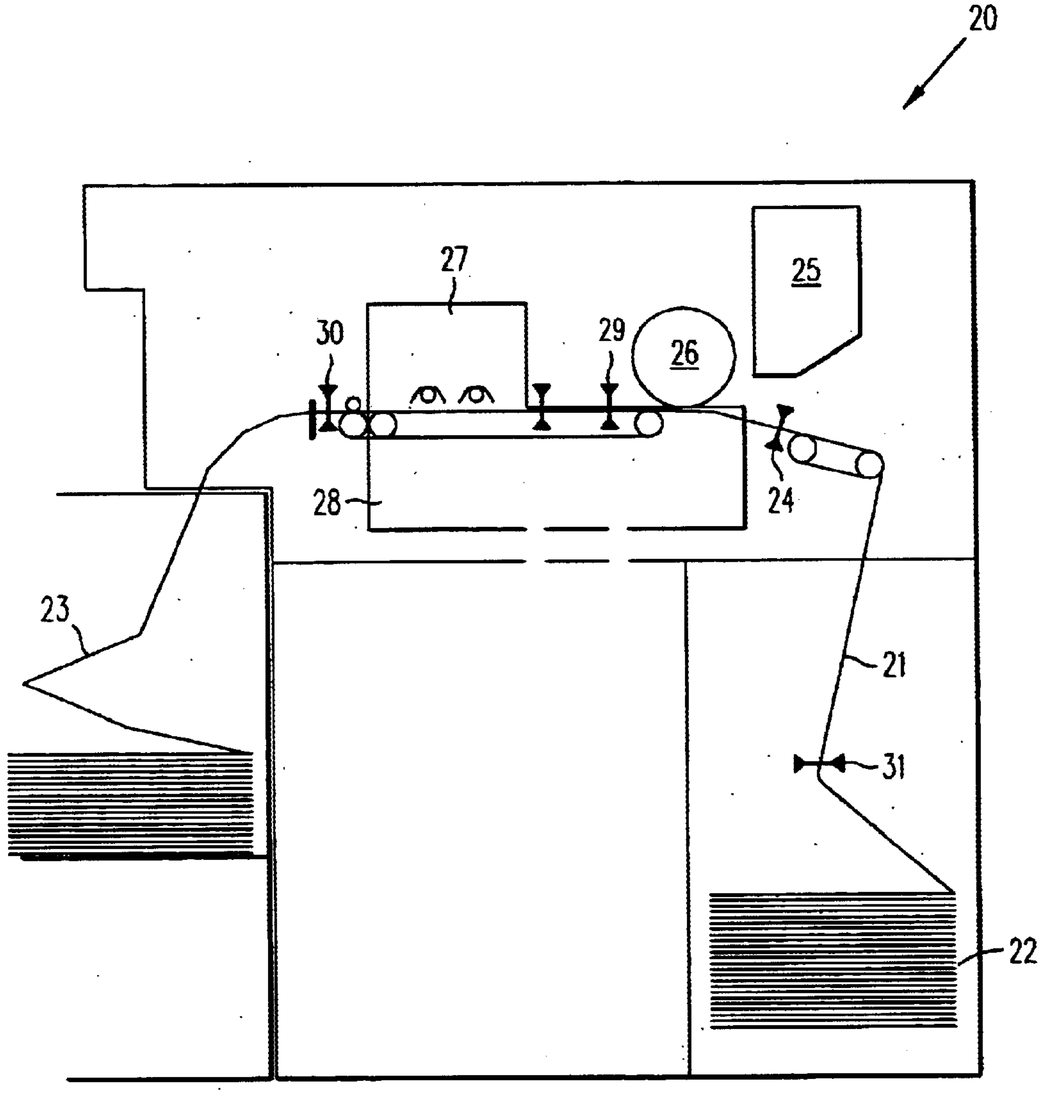
FIG. 2 illustrates a media path within a printer.
Figure 3:
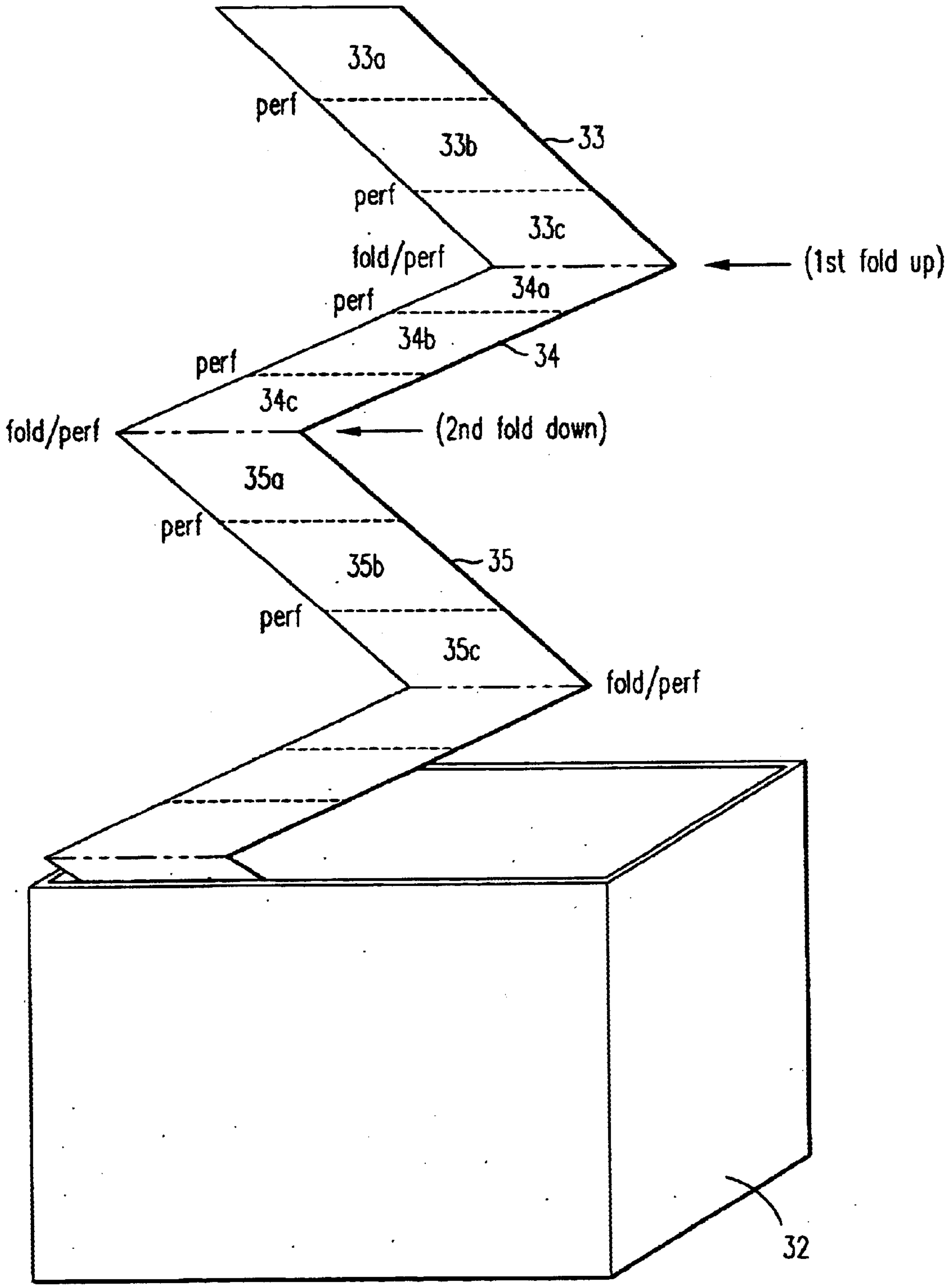
FIG. 3 illustrates a continuous forms media having three forms per sheet.

At step 1209, it is determined whether the remainder of X divided by the #forms/sheet multiplied by 2 is "0". If the remainder is 0, then an unload command is issued in step 1213 and flow diagram 1200 returns to step 101 in FIG. 10. If the remainder is not "0", then the form at the print start position is advanced in response to a form feed issued by printer controller 42 at step 1210. Next, counter X is incremented at step 1211 and at step 1212, it is checked to see if a paper path error has occurred. If no paper path error has occurred then flow diagram 1200 returns to step 1209, otherwise, the media is manually unloaded at step 1214 and the flow diagram returns to step 101 in FIG. 1.

Using the foregoing specification, the invention may be implemented as a machine, process, or article of manufacture by using standard programming and/or engineering techniques to produce programming software, firmware, hardware or any combination thereof.

Any resulting program(s), having computer readable program code, may be embodied within one or more computer usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the internet, intranets, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more image forming devices and/or processing systems including, but not limited to, cpu, memory/storage devices, communication links, communication/transmitting devices, servers, I/O devices, or any subcomponents or individual parts of one or more printing systems and/or processing systems, including software, firmware, hardware or any combination or subcombination thereof, which embody the invention as set forth in the claims.

One skilled in the art of computer science will easily be able to combine the software created as described with appropriate general purpose or special purpose computer hardware and/or image forming hardware to create a computer/image forming system and/or computer/image forming subcomponents embodying the invention and to create a computer/image forming system and/or computer/image forming subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims.

What is claimed is:

1. A method of unloading media from a media path in an image forming device, wherein said media includes a plurality of sheets with each full sheet including N forms per sheet, comprising the steps of:

(a) receiving a first value representing a positioning orientation of a pair of adjacent sheets with respect to a print start position on said media path and a designated first fold orientation, said first value having a value within a range of 0 to (2N−1);

(b) receiving an advance paper request;

(c) advancing a first form positioned at said print start position to a print end position along said media path;

(d) incrementing said first value by one;

(e) if said first value is equivalent to 2N, setting said first value to zero; and (f) repeating steps (b) thru (e) until an automatic unload request is received.

2. The method of claim 1 further comprising, prior to step (a), the step of positioning said first form at said print start position.

3. The method of claim 1, further comprising after step (e), the steps of (g) determining if a paper path error has occurred; and (h) in response to said paper path error, (1) providing a signal indicating said paper path error has occurred (2) if necessary, resetting said first value; and (3) returning to step (b) once said media has been reloaded into said media path; and wherein step (f) further comprises repeating steps (g) and (h).

4. The method of claim 1, wherein step (f) further comprises the step of in response to said unload request, cutting said media after a last printed form and before a first unused form and positioning said first unused form at said print start position such that no forms are wasted during consecutive print runs due to an automatic unload operation.

5. The method of claim 1, wherein step (b) comprises the step of receiving one of a form feed request and a print request.

6. The method of claim 5, wherein step (a) comprises the step of printing information onto said first form.

7. The method of claim 5, wherein step (a) comprises the step of form feeding said first form.

8. A method of unloading media from a media path in an image forming device, wherein said media includes a plurality of sheets with each full sheet including N forms per sheet, comprising the steps of:

(a) receiving a first value representing a positioning orientation of a pair of adjacent sheets with respect to a print start position on said media path and a designated first fold orientation, said first value having a value within a range of 0 to (2N−1);

(b) receiving a first advance paper request;

(c) setting said stacker for a first sheet;

(d) advancing a first form positioned at said print start position to a print end position along said media path;

(e) incrementing said first value by one;

(f) if said first value is equivalent to 2N, setting said first value to zero;

(g) receiving a second advance paper request;

(h) if said first value does not equal zero or N, then repeating steps (d)–(g) until an unload request is received;

(i) if said first value equals zero or N, then resetting said stacker, if necessary, for a second sheet;

(j) advancing a second form positioned at said print start position to a print end position along said media path;

(k) receiving a third advance paper request;

(l) incrementing said first value by one;

(m) if said first value is equivalent to 2N, setting first value to zero; and (n) repeating steps (j)-thru (m) until said unload request is received.

9. The method of claim 8, wherein said first sheet represents a partial or full sheet and said second sheet represents a fall sheet.

10. The method of claim 9, wherein step (c) comprises the steps of;

(1) determining whether said first value is greater-than N;

(2) if said first value is less than N, then providing a first control value to set said stacker to said designated first fold orientation;

(3) if said first value is greater than or equal to N, then providing said first control value to set said stacker to a first fold orientation opposite said designated first fold orientation; and (4) providing a second control value to set said stacker to a fold length of said first sheet.

11. The method of claim 10, wherein step (i) comprises the steps of:

(1) determining whether, said fold length of said first sheet is different from a fold length of said second sheet; and (2) if said first and second fold lengths are different, providing said second control value to set said stacker to said fold length of said second sheet.

12. A method of controlling a stacker for stacking media received from a media path in an image forming device, wherein said media includes a plurality of sheets with each fall sheet including N forms, the method comprising the steps of:

(a) providing a first set of control values to set said stacker for a first sheet, said first sheet representing a partial or full sheet, wherein said providing a first set of control values includes determining said first set of control values based on a first value, a designated first fold orientation, and form definition values, said first value representing a positioning orientation of said first and second of sheets with respect to a print start position in said media path, said first value having a value within the range of 0 to (2N−1), said form definition value including a second value representing a number of forms per fill sheet and a third value representing a length of each of said forms; and (b) providing a second set of control values to' reset said stacker, if necessary, for a second sheet, said second sheet representing a full sheet and adjacent to said first sheet, wherein said providing a second set of control values includes determining said second set of control values based on said first value, said designated first fold orientation, and said form definition values.

13. The method of claim 12, wherein step (a) comprises the steps of:

(1) determining whether said first value is greater than N;

(2) if said first value is less than N, then providing a first control value to set said stacker to said designated first fold orientation;

(3) if said first value is greater than or equal to N, then providing said first control value to set said stacker to a first fold orientation opposite said designated first fold orientation; and (4) providing a second control value to set said stacker to a fold length of said first sheet.

14. The method of claim 13, wherein step (b) comprises the steps of:

(1) determining whether said fold length of said first sheet is different from a fold length of said second sheet; and (2) if said fold lengths of said first and second sheets are different, providing said second control value to set said stacker to said fold length of said second sheet.

15. An image forming device capable of printing onto media having multiple sheets, wherein each full sheet includes multiple forms, comprising:

a print engine having a media path which includes a print start position such that during an automatic unload operation a last printed form from a first print run is removed from said media path and a first unused form is then positioned at said print start position in preparation for a subsequent print run; and a printer controller coupled to said print engine for controlling the movement of forms along said media path during said automatic unload operation based on a first value, wherein said first value represents a positioning orientation of a pair of adjacent sheets with respect to said print start position and a designated first fold orientation, wherein said printer controller provides control values to a stacker based on said first value, said designated first fold orientation value and form definition values, wherein said form definition values include a second value representing a length of each of said forms and a third value representing a number of forms per full sheet.

16. The image forming device of claim 15, further comprising an operator panel coupled to said printer controller, said operator panel having an input for receiving said first value.

17. The image forming device of claim 15, further comprising a memory device coupled to said printer controller, wherein said memory device stores said first value and said form definition values during said automatic unload operation.

18. The image forming device of claim 17, wherein said memory device is located within said printer controller.

19. The image forming device of claim 17, further comprising said stacker, wherein said stacker includes a folding mechanism, said folding mechanism stacking each of said sheets to have its original fold orientation based on said control values.

20. The image forming device of claim 19, further comprising an operator panel coupled to said printer controller, said operator panel having at least one input for receiving said first value and said form definition values.

21. A printer controller, comprising:

a memory device for staring a first value and form definition values during an automatic unload operation, said first value representing a positioning orientation of a pair of adjacent sheets with respect to a print start position on a media path and a designated first fold orientation; and a processing unit coupled to said memory device, said processing unit providing a first set of control values and a second set of control values based on said first value, said designated first fold orientation, and said form definition values, wherein said first set of control values sets a stacker for a first sheet representing a partial or full sheet, and wherein said second set of control values resets said stacker, if necessary, for a second sheet representing a fun sheet, wherein said full sheet includes N forms and said partial sheet includes less than N forms, and wherein said first value has a value within a range of 0 to (2N−1) and said form definition includes a second value representing a number of said forms per full sheet and a third value representing a length of one of said forms.

22. The printer controller of claim 21, wherein said processing unit provides a third set of control values for automatically unloading a last printed form from a first print run and then positioning a first unused form at a print start position in said media path for a subsequent print run.

23. The printer controller of claim 22, wherein said last printed form and said first unused form are from said pair of adjacent sheets.

24. A program, on a computer usable medium, for controlling a stacker for stacking media received from a media path in an image forming device, wherein said media includes a plurality of sheets with each sheet including N forms, the program comprising:

means for providing a first set of control values to set said stacker for a first sheet, said first sheet representing a partial or full sheet, wherein said means for providing a first set of control values includes means for determining said first set of control values based on a first value, a designated first fold orientation, and form definition values, said first value representing a positioning orientation of said first and second of sheets with respect to a print start position in said media path, said first value having a value within the range of 0 to (2N−1), said form definition value including a second value representing a number of forms per full sheet and a third value representing a length of each of said forms; and means for providing a second set of control values to reset said stacker, if necessary, for a second sheet, said second sheet representing a full sheet and adjacent to said first sheet, wherein said means for providing a second set of control values includes means for determining said second set of control values based on said first value, said designated first fold orientation, and said form definition values.

* * * * *